US010851736B1

(12) United States Patent
Ozika et al.

(10) Patent No.: US 10,851,736 B1
(45) Date of Patent: Dec. 1, 2020

(54) DUAL ARMATURE PURGE VALVE

(71) Applicants: DENSO International America, Inc., Southfield, MI (US); DENSO CORPORATION, Kariya (JP)

(72) Inventors: Michael Ozika, Novi, MI (US); Daniel McGrail, Southfield, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 16/429,251

(22) Filed: Jun. 3, 2019

(51) Int. Cl.
*F02M 25/08* (2006.01)
*F16K 31/06* (2006.01)
*F16K 11/24* (2006.01)

(52) U.S. Cl.
CPC ......... *F02M 25/0836* (2013.01); *F16K 11/24* (2013.01); *F16K 31/0624* (2013.01); *F02M 2025/0845* (2013.01)

(58) Field of Classification Search
CPC ........ F02M 25/0836; F02M 2025/0845; F16K 11/24; F16K 31/0624
USPC .......................... 123/520; 251/129.09, 129.1
See application file for complete search history.

(56) References Cited

U.S. PATENT DOCUMENTS

| | | | | |
|---|---|---|---|---|
| 3,842,860 A * | 10/1974 | Stampfli | ............. | F16K 31/0606 137/596.17 |
| 4,127,097 A * | 11/1978 | Takimoto | ........... | F02M 25/0836 123/520 |
| 4,258,749 A * | 3/1981 | Mayer | ................. | F16K 31/0651 137/596.17 |
| 4,355,661 A * | 10/1982 | Mayer | ................. | F16K 31/0651 137/881 |
| 4,546,955 A | 10/1985 | Beyer et al. | | |
| 4,655,255 A * | 4/1987 | Rode | .................... | F16K 31/0606 137/596.17 |
| 4,922,961 A * | 5/1990 | Maehara | ............... | B60T 8/3645 137/596.17 |
| 5,143,120 A * | 9/1992 | Tinz | ................... | F02M 25/0836 137/601.01 |

(Continued)

FOREIGN PATENT DOCUMENTS

| | | | | |
|---|---|---|---|---|
| DE | 4003036 C1 * | 11/1990 | ....... | B60K 15/03519 |
| EP | 1076171 A2 * | 2/2001 | ......... | F02M 25/0836 |

(Continued)

*Primary Examiner* — John M Zaleskas
(74) *Attorney, Agent, or Firm* — Harness, Dickey & Pierce, P.L.C.

(57) ABSTRACT

A purge valve for an EVAP system has a chamber including an inlet conduit for receiving fuel vapors from an EVAP canister, a first outlet conduit to the engine for the fuel vapors, and a second outlet conduit to the engine for the fuel vapors. Energizing the purge valve at a first current actuates a first armature from a closed position to an open position to open a first opening and allow fuel vapors to flow through the first outlet conduit to the engine, without actuating the second armature from a closed position. Energizing the purge valve at a second current that is greater than the first current actuates a second armature from a closed position to an open position to open the second opening and allow fuel vapors to flow through the second outlet conduit to the engine while maintaining the first armature in the fully open position.

18 Claims, 10 Drawing Sheets

(56) References Cited

U.S. PATENT DOCUMENTS

| | | | | |
|---|---|---|---|---|
| 5,216,998 | A * | 6/1993 | Hosoda | F02D 41/0032 123/520 |
| 5,289,811 | A * | 3/1994 | Covert | F02M 25/0836 123/520 |
| 5,341,787 | A * | 8/1994 | Zabeck | F02M 25/0836 123/458 |
| 5,353,770 | A * | 10/1994 | Osanai | F02D 41/004 123/520 |
| 5,458,150 | A * | 10/1995 | Tamaoki | B60T 8/3675 137/596.17 |
| 5,717,372 | A * | 2/1998 | Cannon | F02M 59/466 251/129.01 |
| 6,026,860 | A * | 2/2000 | Teichmann | F16K 31/06 137/870 |
| 6,032,667 | A * | 3/2000 | Heinonen | A61M 16/12 128/205.24 |
| 6,392,516 | B1 * | 5/2002 | Ward | H01F 7/081 335/220 |
| 6,489,870 | B1 * | 12/2002 | Ward | H01F 7/081 335/220 |
| 8,258,904 | B2 | 9/2012 | Ben-Asher et al. | |
| 2007/0236084 | A1 * | 10/2007 | Frank | B60T 15/027 303/119.2 |
| 2009/0078238 | A1 * | 3/2009 | Ueda | F02M 25/0836 123/520 |
| 2009/0309413 | A1 * | 12/2009 | Bensch | B60T 17/04 303/20 |
| 2010/0059697 | A1 * | 3/2010 | Frank | B60T 15/027 251/129.15 |
| 2010/0072810 | A1 * | 3/2010 | Bensch | B60T 17/228 303/17 |
| 2010/0176323 | A1 * | 7/2010 | Nguyen | F16K 27/003 251/129.15 |
| 2011/0000563 | A1 * | 1/2011 | Ito | F16K 11/22 137/596.17 |
| 2013/0042839 | A1 * | 2/2013 | Takahashi | F02M 25/0836 123/520 |
| 2013/0318954 | A1 * | 12/2013 | Frank | B60G 17/0155 60/407 |
| 2013/0320639 | A1 * | 12/2013 | Frank | F16K 31/0675 280/5.514 |
| 2015/0048577 | A1 * | 2/2015 | Frank | B60G 17/0523 280/5.514 |
| 2016/0298785 | A1 * | 10/2016 | Kim | F02M 25/0836 |
| 2018/0274493 | A1 * | 9/2018 | Tawa | F02M 25/0836 |
| 2019/0145541 | A1 * | 5/2019 | Vopel | F16K 31/0606 251/129.16 |

FOREIGN PATENT DOCUMENTS

| | | | | |
|---|---|---|---|---|
| WO | WO-2013076768 | A1 * | 5/2013 | F16K 11/24 |
| WO | 2017215842 | A1 | 12/2017 | |

* cited by examiner

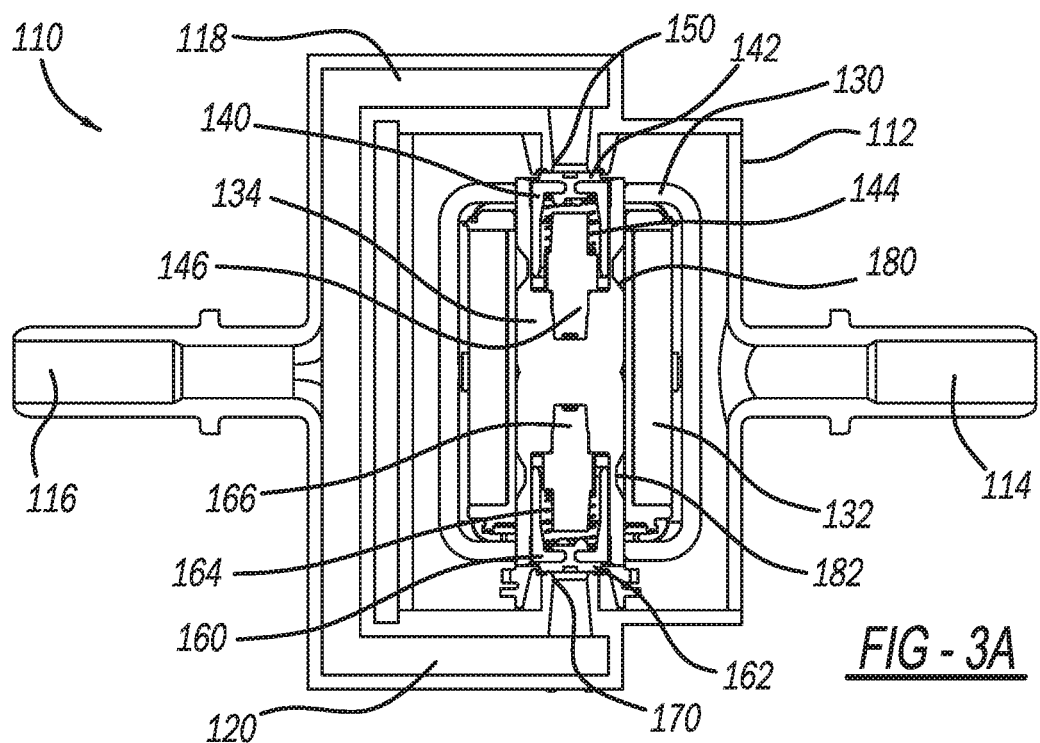
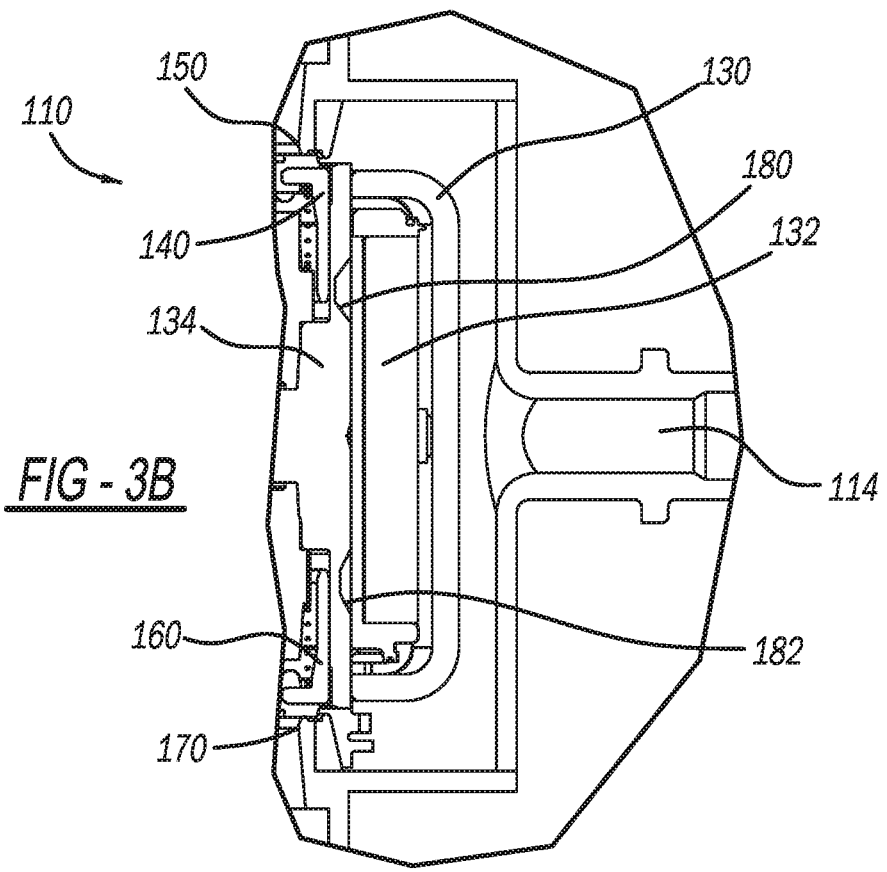

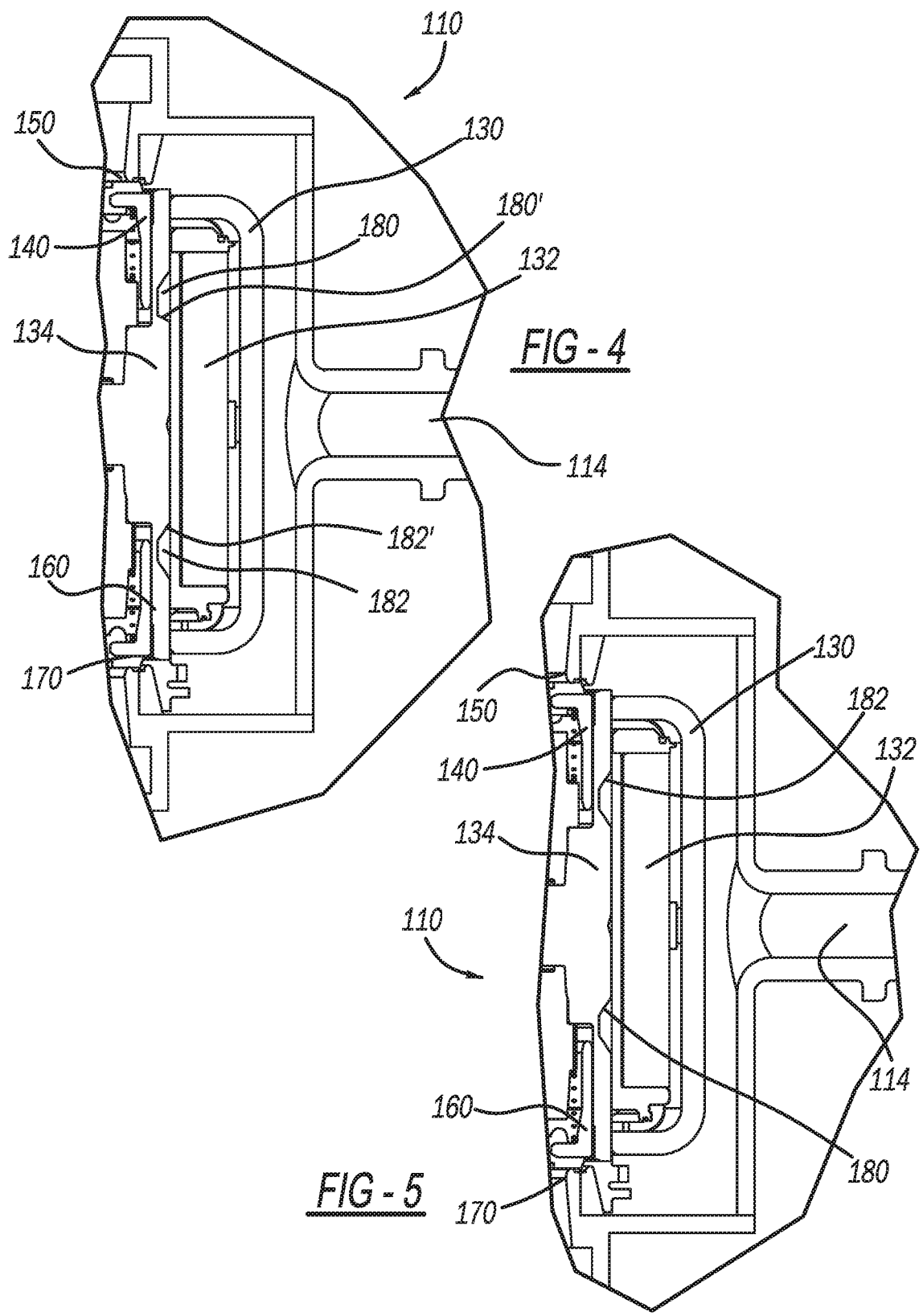

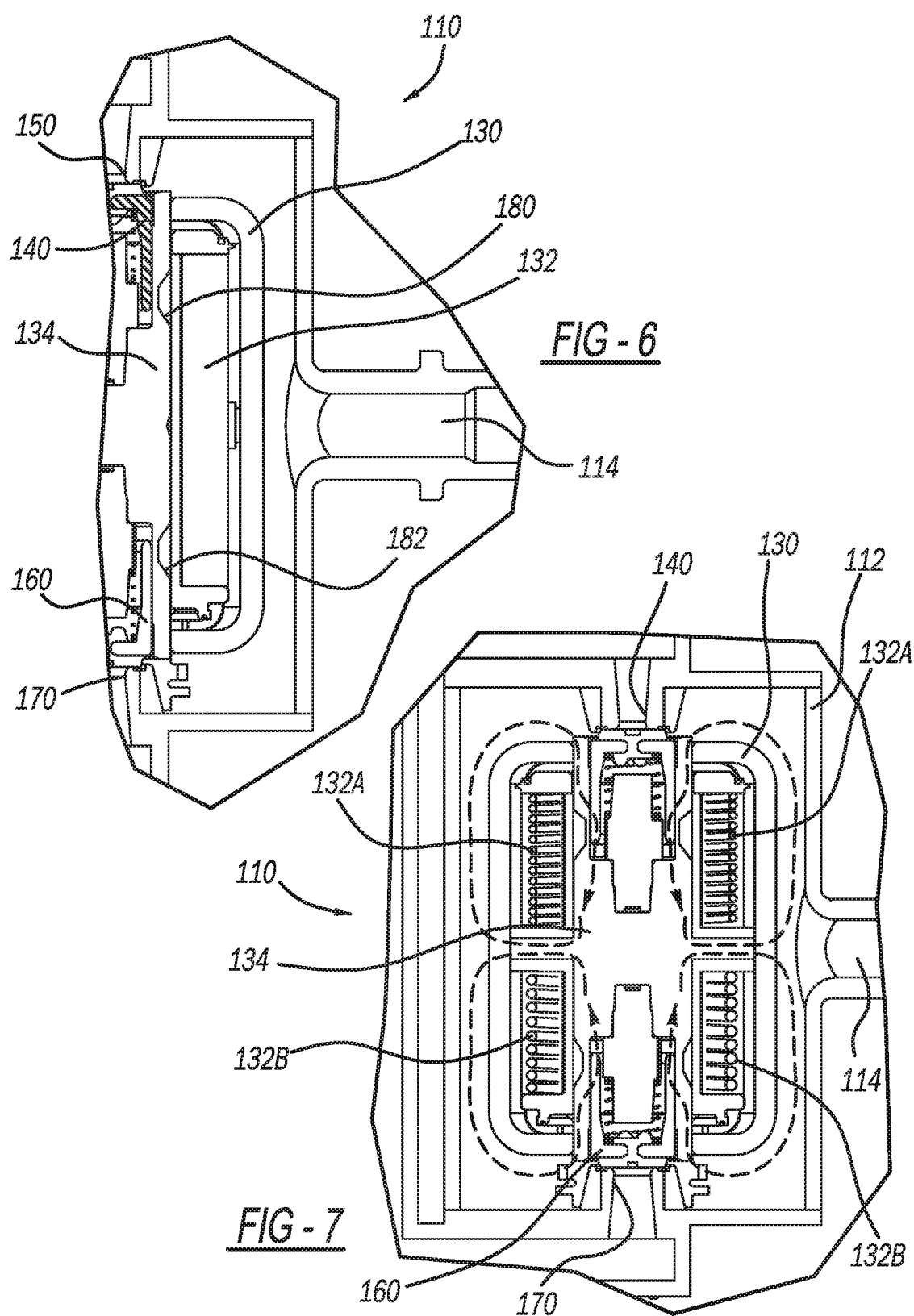

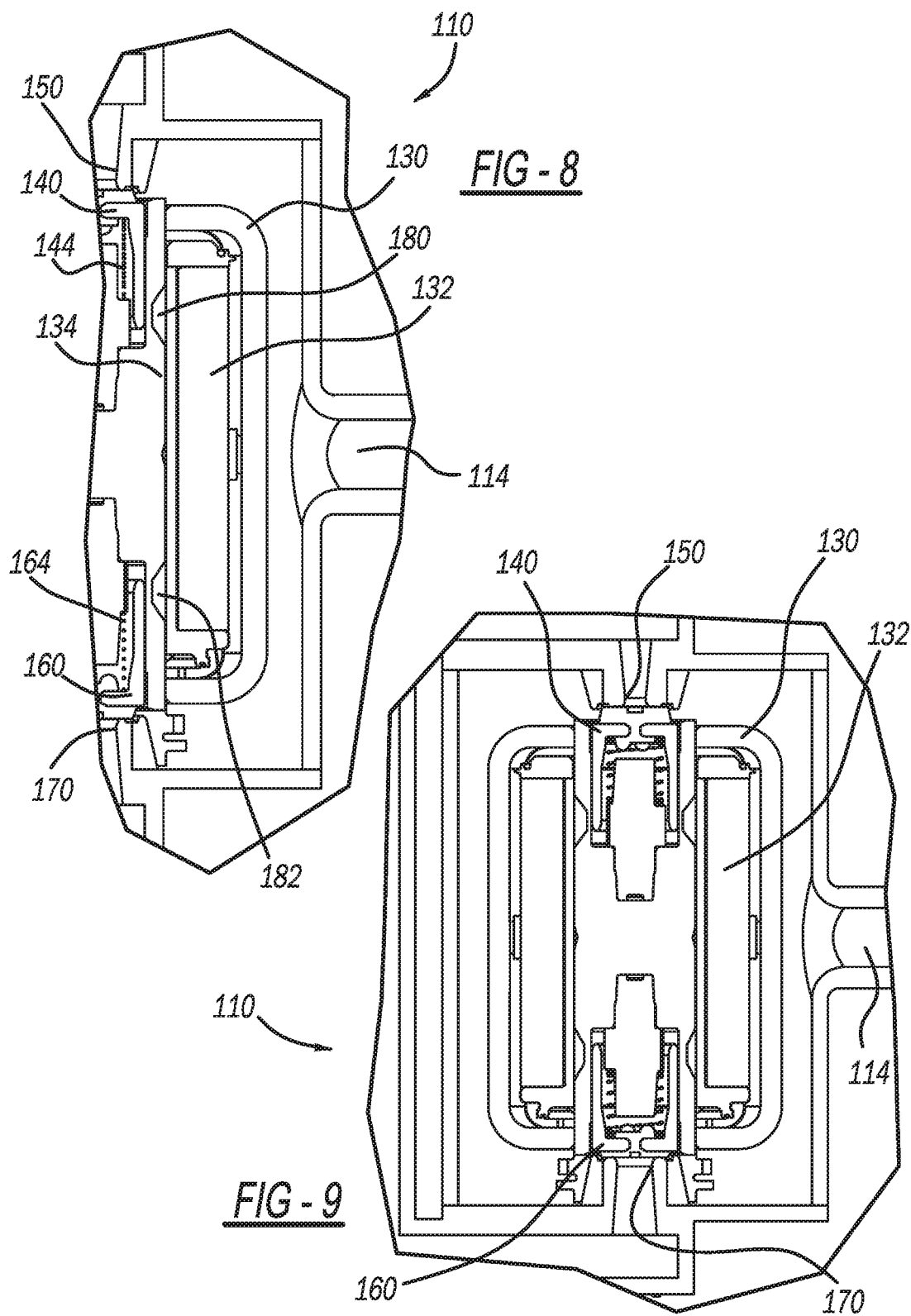

DUAL ARMATURE PURGE VALVE

FIELD

The present disclosure relates to a dual armature purge valve, such as for an evaporative emission control (EVAP) system.

BACKGROUND

This section provides background information related to the present disclosure, which is not necessarily prior art.

Fuel supply systems often include a purge valve to regulate flow of fuel vapor from an emissions control carbon canister to an engine. When the engine is running, negative pressure in the engine intake manifold is created. When the purge valve is closed, no vapor flows to the engine. When the purge valve is opened, vapor flows from the canister to the engine's intake manifold. This allows fuel vapors to be burned in combustion, rather than released into the atmosphere.

To control the fuel vapor flow through the purge valve, a powertrain control module calculates the amount of fuel vapor flow required by monitoring engine coolant temperature, intake air temperature, throttle position, etc., and controls the purge valve often by pulse width modulation (PWM) of the applied voltage using a duty cycle (0-100%). In hybrid electric vehicles (HEV), which are increasing in popularity, the engine is not always running, making it difficult to purge vapors from the canister due to the lack of vacuum. Additionally, many HEVs operate most fuel-efficiently at near wide-open throttle conditions. In this case, only a very low vacuum is available to draw the vapors when the purge valve is opened.

It would therefore be advantageous to have a purge valve that has a high flow capacity, and still maintains good flow accuracy in low flow conditions to make the most of the limited opportunities the purge valve has to purge fuel vapors from the canister. In an attempt to achieve this, the orifice of conventional purge valves has been increased, which results in higher flow rates. However, low flow accuracy decreases due to the larger flow area provided by the increased orifice size. To address this issue, two purge valves may be used, but two purge valves undesirably require two electrical connectors, additional wiring harnesses, two inlet ports, and two outlet ports, thus adding to the complexity and cost of the system. The present teachings advantageously include improved purge valves that address these needs in the art, as explained in detail herein.

SUMMARY

This section provides a general summary of the disclosure, and is not a comprehensive disclosure of its full scope or all of its features.

The present disclosure includes a purge valve for an evaporative emission control (EVAP) system of an engine fuel supply system. The purge valve has a chamber having an inlet conduit for receiving fuel vapors from an EVAP canister, a first outlet conduit to the engine for the fuel vapors, and a second outlet conduit to the engine for the fuel vapors. Energizing the purge valve at a first current actuates a first armature from a closed position to an open position to open a first opening and allow fuel vapors to flow through the first outlet conduit to the engine, without actuating the second armature from a closed position. Energizing the purge valve at a second current that is greater than the first current actuates a second armature from a closed position to an open position to open the second opening and allow fuel vapors to flow through the second outlet conduit to the engine.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3A is a cross-sectional view of the purge valve in accordance with an embodiment of the present disclosure;

FIG. 3B is a close-up view of the purge valve of FIG. 3A;

FIG. 4 is a view of the purge valve in accordance with another embodiment of the present disclosure;

FIG. 5 is a view of the purge valve in accordance with an additional embodiment of the present disclosure;

FIG. 6 is a view of the purge valve according to yet another embodiment of the present disclosure;

FIG. 7 is a cross-sectional view of the purge valve according to a further embodiment of the present disclosure;

FIG. 8 is a view of the purge valve in accordance with an additional embodiment of the present disclosure;

FIG. 9 is a cross-sectional view of the purge valve according to another embodiment of the present disclosure;

DETAILED DESCRIPTION

Example embodiments will now be described more fully with reference to the accompanying drawings.

Figure 1:
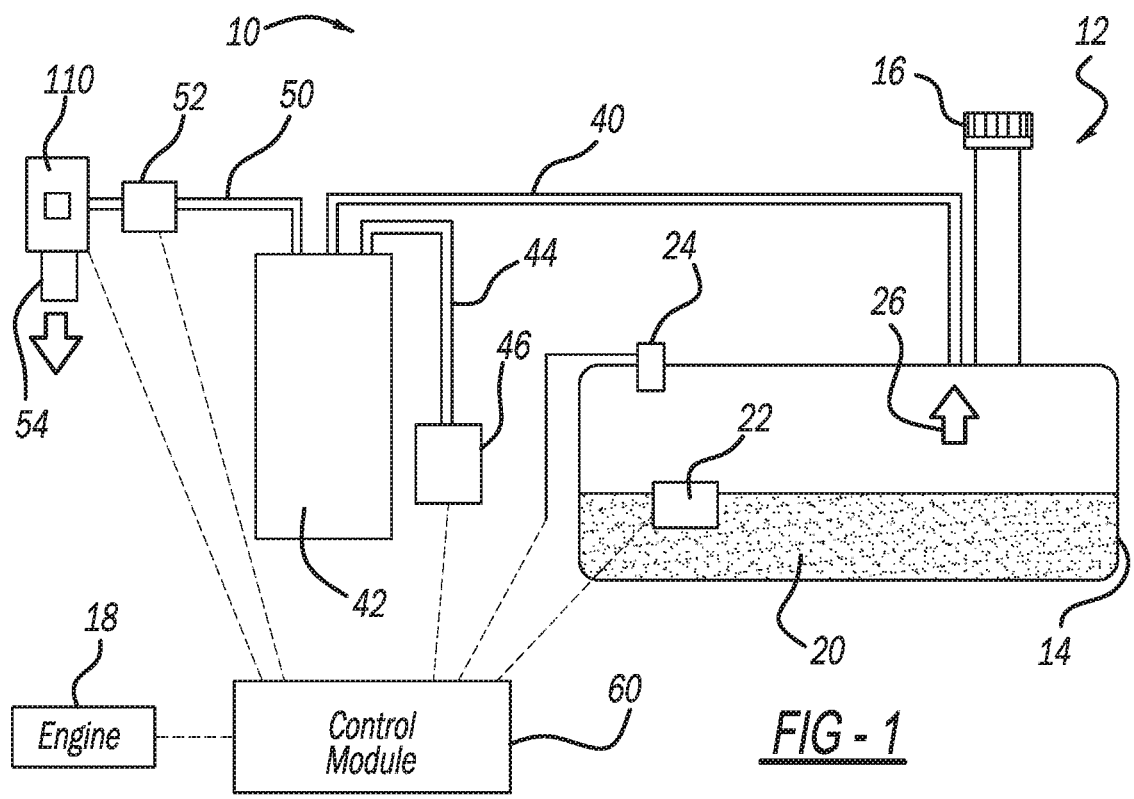
FIG. 1 illustrates components of an evaporative emission control (EVAP) system for an engine fuel supply system, the EVAP system including a purge valve in accordance with the present disclosure.

With initial reference to FIG. 1, an evaporative emission control (EVAP) system 10 for an engine fuel supply system 12 is illustrated. The engine fuel supply system 12 includes a fuel tank 14 with a sealed fuel cap 16. The fuel tank 14 is configured to store fuel 20 for supply to any suitable engine 18. Suitable engines include, but are not limited to, vehicle engines, construction equipment engines, military equipment engines, generator engines, etc. A fuel level sensor 22 is included to determine how much fuel 20 is within the fuel tank 14. A fuel tank pressure sensor 24 measures the pressure of the fuel tank 14. The fuel level sensor 22 and the fuel tank pressure sensor 24 may be any suitable conventional sensors.

Under some conditions, fuel vapors 26 may be released from the fuel 20. The fuel vapors 26 are vented from within the fuel tank 14 through a vent line 40. The vent line 40 extends from the fuel tank 14 to an EVAP vapor canister 42. The fuel vapors 26 are trapped within the EVAP vapor canister 42. Extending from the EVAP vapor canister 42 is a vent line 44 having an EVAP vent valve 46. The EVAP vent valve 46 may be any suitable valve, such as a solenoid valve. The EVAP vapor canister 42 absorbs the fuel vapors 26, such as with activated charcoal. The fuel vapors 26 are stored in the EVAP vapor canister 42 until the engine is started and warmed to a suitable temperature.

Also extending from the EVAP vapor canister 42 is a purge line 50. Along the purge line 50 is a purge flow sensor 52. The purge line 50 extends to an EVAP purge valve 110. The EVAP purge valve 110 controls the flow of fuel vapors 26 through an engine line 54 to a throttle body of the engine 18.

A control module 60 controls the opening and closing of the EVAP purge valve 110 by controlling the amount of electrical current applied to the EVAP purge valve 110 as described herein and illustrated in FIGS. 11A, 11B, 11C, 12A, 12B, 12C, 13A, 13B, and 13C. The control module 60 controls the actuation of the EVAP purge valve 110 based on, for example, engine coolant temperature, intake air temperature, throttle position, etc. The control module 60 controls the purge valve 110 typically by pulse width modulation (PWM) of the applied voltage using a duty cycle (0-100%). This PWM control allows the purge valve 110 to regulate the flow of vapors from zero flow to max flow. The frequency of the PWM signal is appropriately selected to be slow enough that the purge valve 110 can fully open each time a threshold current is applied, and completely closed each time the current is removed. An appropriate PWM frequency is typically 10 Hz to 20 Hz, for example. The control module 60 also controls the EVAP vent valve 46.

In this application, including the definitions below, the term "control module" may be replaced with the term "circuit." The term "control module" may refer to, be part of, or include processor hardware (shared, dedicated, or group) that executes code and memory hardware (shared, dedicated, or group) that stores code executed by the processor hardware. The code is configured to provide the features of the control module 60 described herein. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

Figure 2:
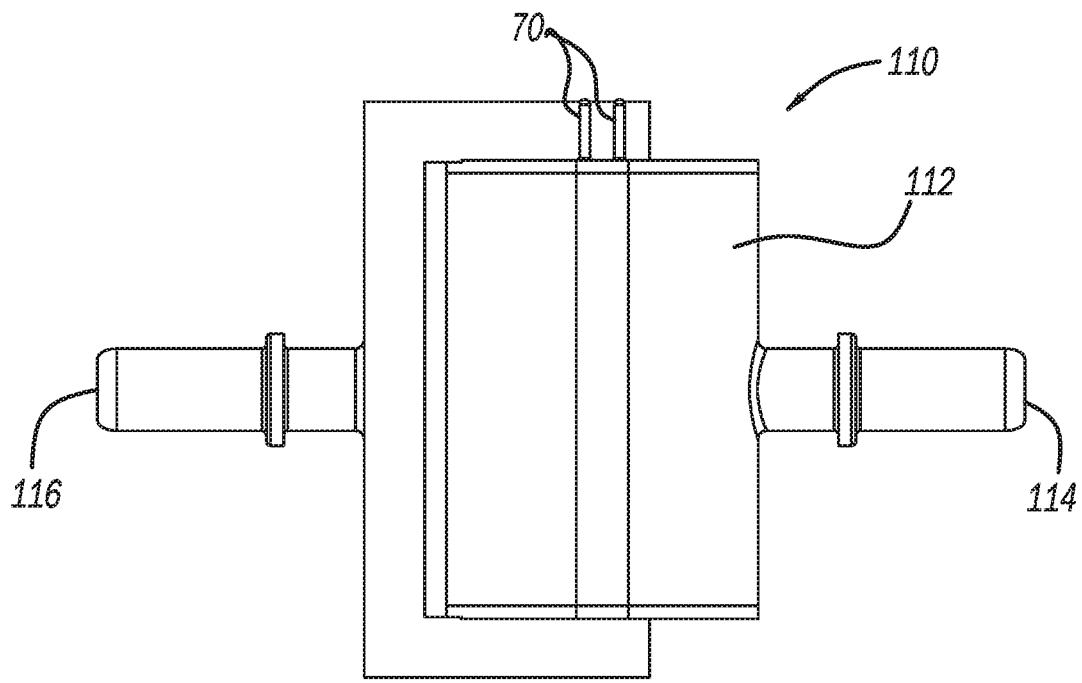
FIG. 2 is a side view of the purge valve in accordance with the present disclosure.

With additional reference to FIGS. 2, 3A, and 3B, the EVAP purge valve 110 will now be described in additional detail. A main inlet conduit 114 is connected to the purge line 50. Thus, fuel vapors 26 flowing through the purge line 50 are introduced into the EVAP purge valve 110 through the main inlet conduit 114. A main outlet conduit 116 is connected to the engine line 54. Thus, fuel vapors flowing from the EVAP purge valve 110 flow to the engine through the main outlet conduit 116. A first outlet conduit 118 and a second outlet conduit 120 both feed into the main outlet conduit 116. The EVAP purge valve 110 includes a chamber 112. Fuel vapors 26 flow into the chamber 112 through the main inlet conduit 114.

With particular reference to FIGS. 3A and 3B, within the chamber 112 is yoke 130 and a coil 132. The coil 132 surrounds a stator core 134. Seated within the stator core 134 is a first armature 140, which in the example illustrated is a plunger. The first armature 140, the stator core 134, and the yoke 130 are made of ferromagnetic materials. Mounted to the first armature 140 is a first seal 142. A first return spring 144 biases the first armature 140 is a closed position. The first return spring 144 is seated on any suitable support 146. In the closed position, the first seal 142 is pressed against a first opening 150 to prevent the flow of fuel vapors 26 through the first opening 150 and into the first outlet conduit 118. When a sufficient amount of current is introduced to the coil 132 to energize the coil 132, the first armature 140 is actuated to move to an open position. In the open position, the first seal 142 moves away from the first opening 150 to allow fuel vapors 26 to flow through the first opening 150.

Figure 11A:
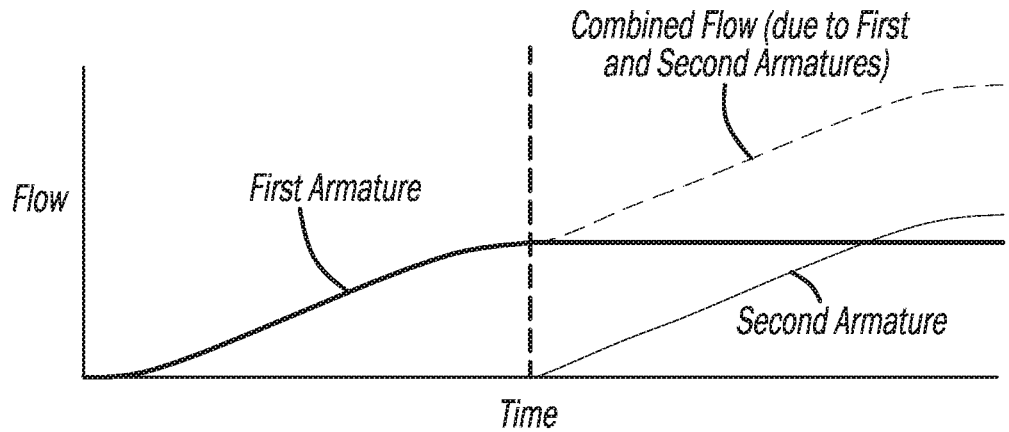
FIG. 11A illustrates an exemplary flow versus time diagram for an exemplary purge valve in accordance with the present disclosure.
Figure 11B:
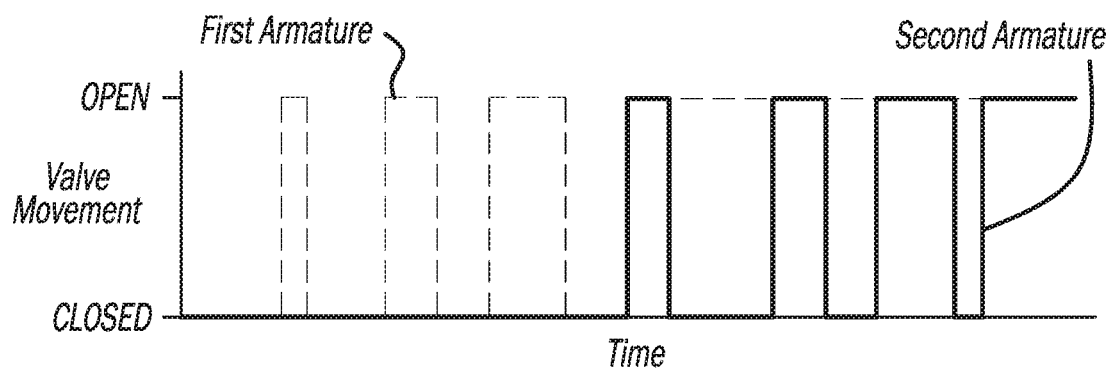
FIG. 11B illustrates an exemplary valve movement versus time diagram for the purge valve.
Figure 11C:
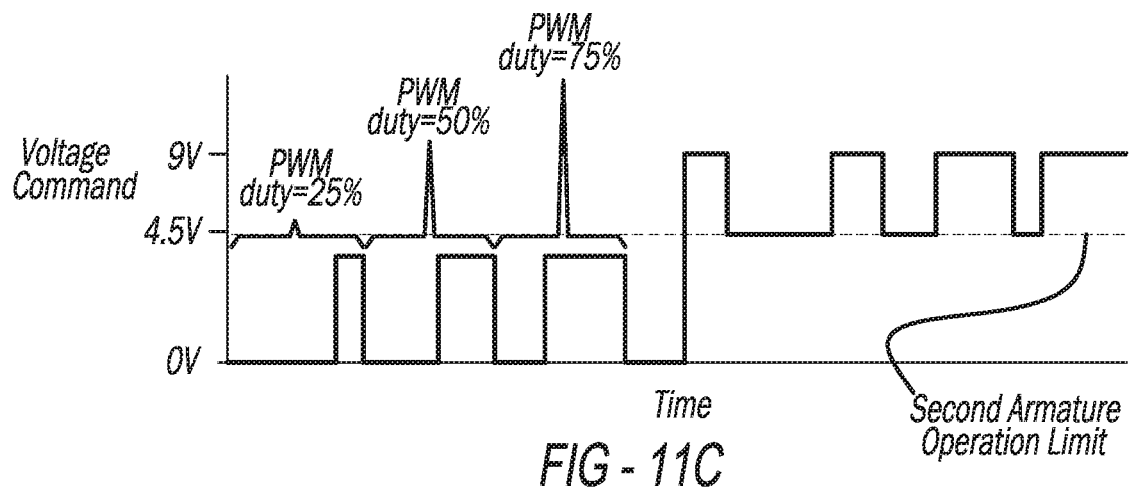
FIG. 11C illustrates an exemplary voltage command versus time diagram for the purge valve.
Figure 12A:
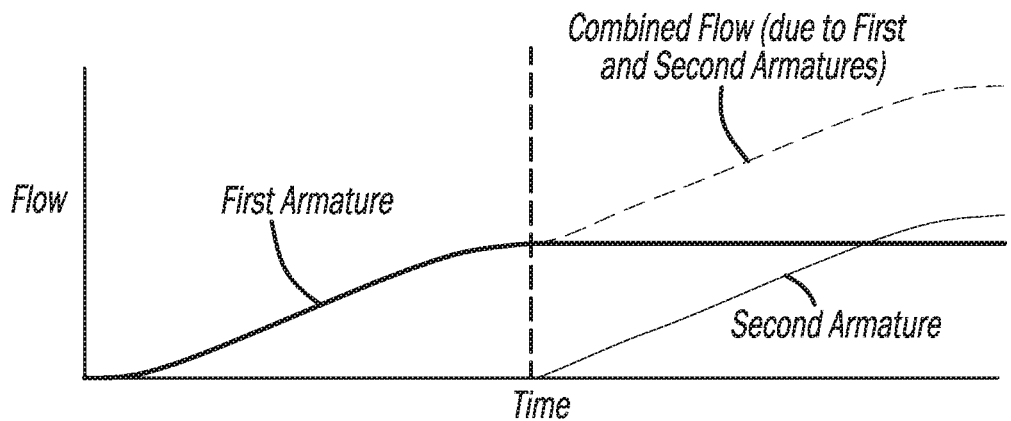
FIG. 12A illustrates an exemplary flow versus time diagram for an additional exemplary purge valve in accordance with the present disclosure.
Figure 12B:
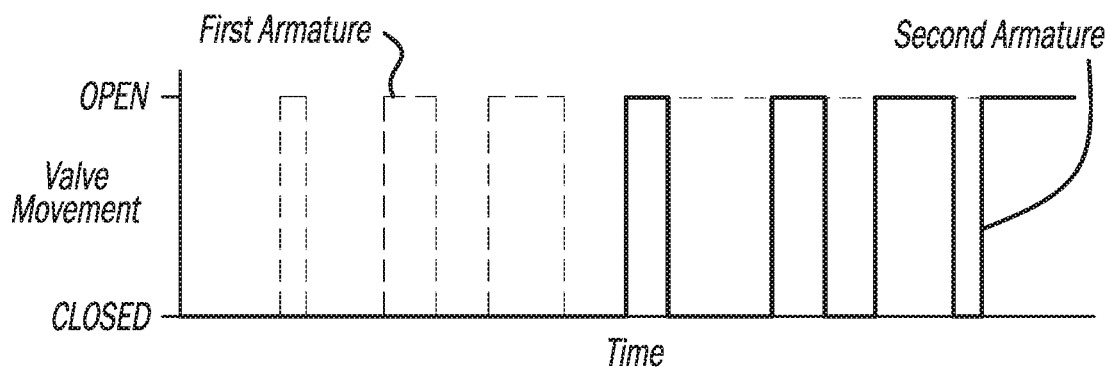
FIG. 12B illustrates an exemplary valve movement versus time diagram for the additional exemplary purge valve.
Figure 12C:
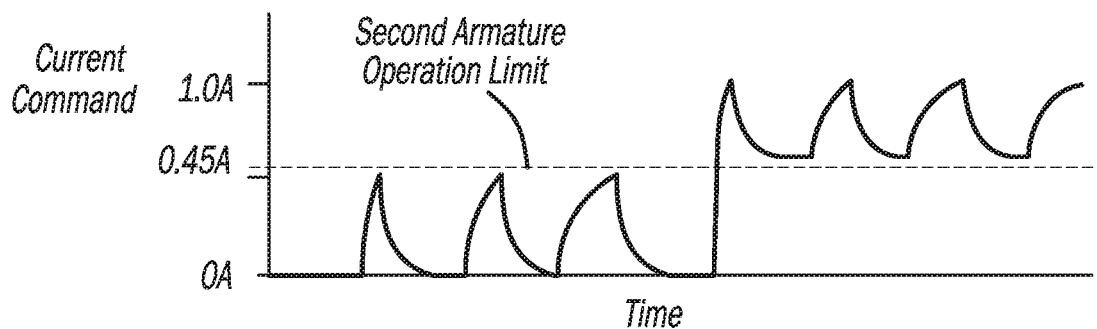
FIG. 12C illustrates an exemplary current command versus time diagram for the additional exemplary purge valve.
Figure 13A:
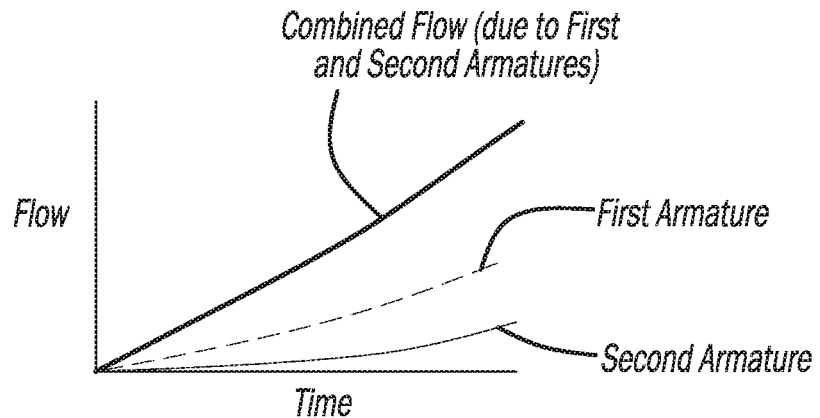
FIG. 13A illustrates an exemplary flow versus time diagram for yet another exemplary purge valve in accordance with the present disclosure.
Figure 13B:
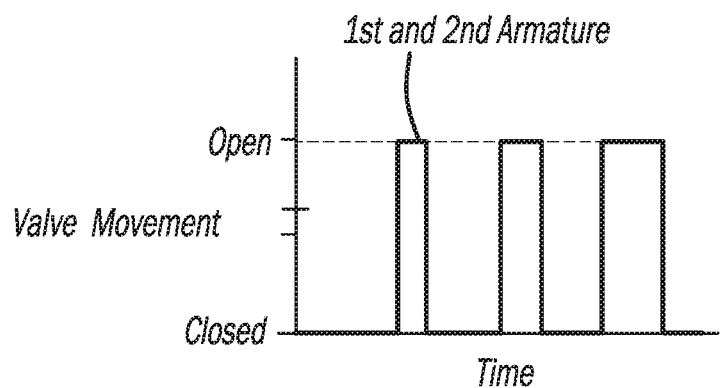
FIG. 13B illustrates an exemplary valve movement versus time diagram for the yet another purge valve.
Figure 13C:
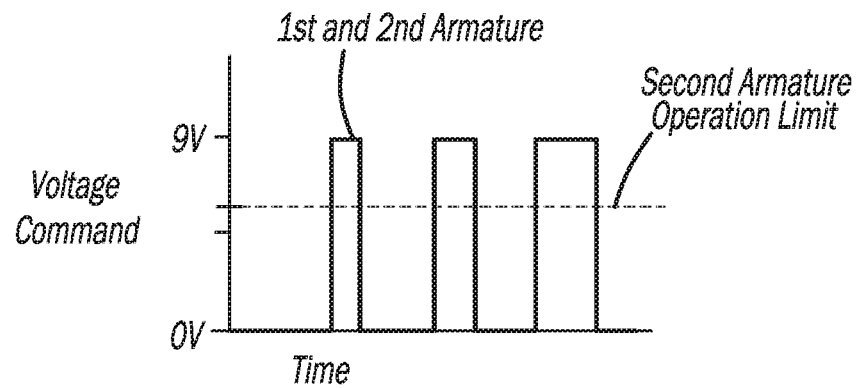
FIG. 13C illustrates an exemplary voltage command versus time diagram for the yet another purge valve.

As explained further herein, the proportion of time that the first armature 140 is opened depends on the amount of current introduced to the coil 132, and the time duration that the current is applied. This modulation of the armature 140 is typically accomplished in one of two ways. One way is by modulating voltage supplied to the coil 132. In typical automotive applications, the voltage applied to the coil 132 is the same as that of the vehicle battery and can vary over time. When modulating voltage, the current applied to the coil 132 will be dependent on the voltage and resistance of the coil 132. Therefore the current is designed to be within the required limits by appropriately accounting for the voltage range that will be applied to the coil 132 and the expected resistance range of the coil 132. This method of control is shown in FIGS. 11A-11C for example. A second way of modulating the current is via a current controlling driver. In this case, the current controlling driver is configured to directly pulse width modulate the current. This will provide a more precise control of current to the coil 132. This method of control is shown in FIGS. 12A-12C for example.

The EVAP purge valve 110 further includes a second armature 160, which in the example of FIGS. 2-10 is linearly aligned with the first armature 140 along a longitudinal axis of the EVAP purge valve 110. The second armature 160 can be a plunger, such as in the example illustrated. The second armature 160 is made of ferromagnetic material. The second armature 160 includes a second seal 162. The second armature 160 is biased in a closed position by a second return spring 164. The second return spring 164 is seated upon any suitable support 166. In the closed position, the second seal 162 abuts a second opening 170 to prevent the flow of fuel vapors 26 through the second opening 170 and into the second outlet conduit 120. When the coil 132 is energized with a sufficient amount of current, the second armature 160 is actuated to an open position whereby the second seal 162 is spaced apart from the second opening 170 to allow fuel vapors 26 to flow through the second opening 170 and into the second outlet conduit 120. Similar to the first armature 140, the proportion of time that the second armature 160 is opened is dependent on the applied current and the time duration that the current is applied via some pulse width modulation control.

Figure 14:
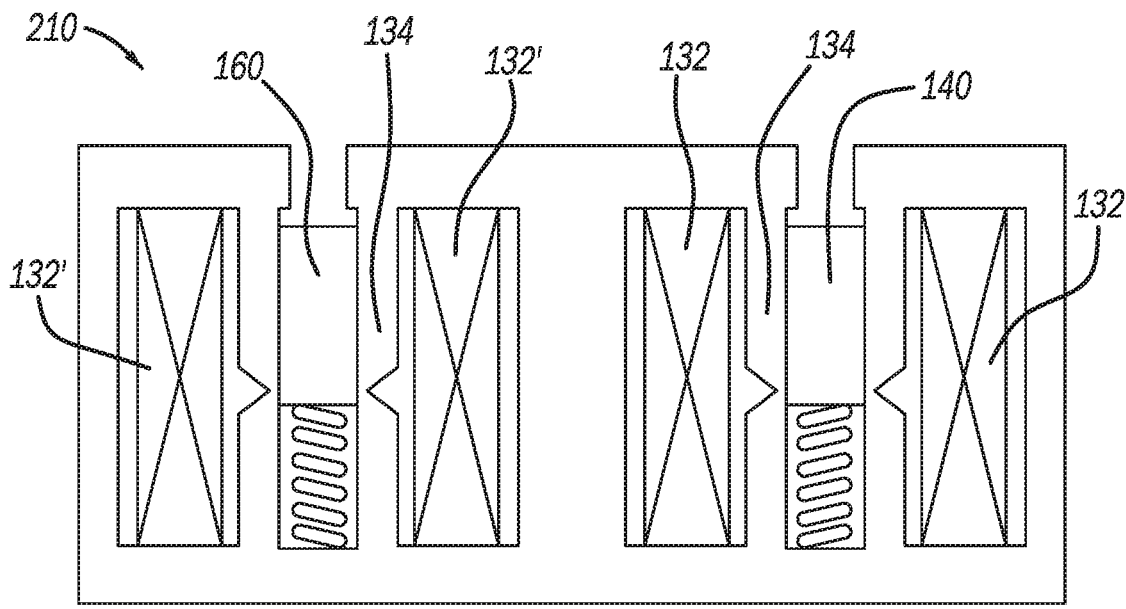
FIG. 14 illustrates an additional purge valve in accordance with the present disclosure in which two armatures actuate in a common direction.
Figure 15:
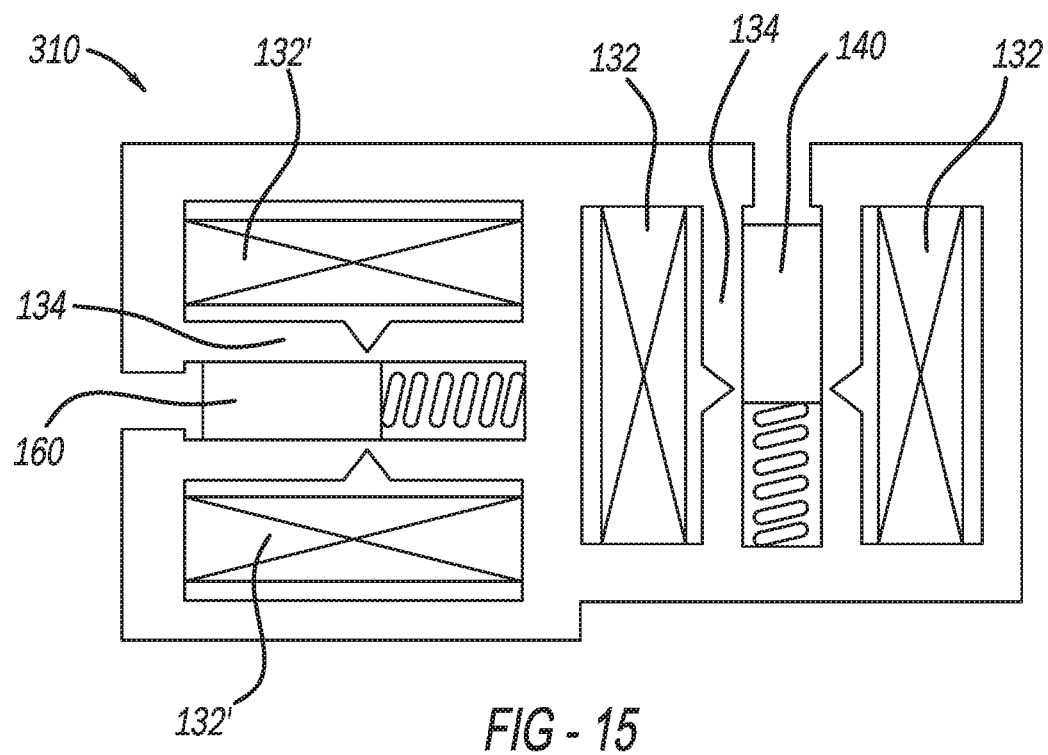
FIG. 15 illustrates another purge valve in accordance with the present disclosure in which two armatures actuate along different axes.

Although the second armature 160 is linearly aligned with the first armature 140 in the example of FIGS. 2-10, the second armature 160 may be arranged in any other suitable manner as well. For example and as illustrated in FIG. 14, the second armature 160 may be arranged offset from, and to actuate parallel to, the first armature 140. Coil 132' surrounds the second armature 160. In the exemplary application of FIG. 15, the second armature 160 can be arranged to actuate in a direction along a different axis than the first armature 140 (e.g., such as perpendicular).

The control module 60 determines the amount of fuel vapor flow required by monitoring various parameters, such as, but not limited to, the following: engine coolant temperatures, engine intake air temperature; throttle position; etc. The control module 60 controls the purge valve 110 in any suitable manner, such as by a duty cycle (0-100%) with a pulse width modulation (PWM) signal (see FIGS. 11A, 11B, 11C, 12A, 12B, 12C, 13A, 13B, and 13C). When the control module 60 determines that a first level of fuel vapor flow through the purge valve 110 is appropriate based on the measured parameters, the control module 60 will input (or cause to be input) a current via a PWM signal to the purge valve 110 that is below a second armature operation limit. In response, the first armature 140 of the purge valve 110 will modulate between open and closed, but the second armature 160 will remain closed.

When the control module 60 determines that based on the measured parameters a greater magnitude of fuel vapor flow through the purge valve 110 is appropriate, the control module 60 will introduce, or cause to be introduced, additional current to the purge valve 110 that exceeds the second armature 160 operation limit. In response to the increased current, the second armature 160 is actuated to open the second opening, and the first opening 150 remains fully open due to the first armature 140 remaining fully open (i.e., in the downward, actuated position as illustrated in the drawings). The proportion of time that the second armature 160 is opened is dependent on the applied current and the time duration that the current is applied via some pulse width modulation control. Examples of typical operation of the purge valve 110 are graphically illustrated in FIGS. 11A, 11B, 11C, 12A, 12B, and 12C. Alternatively, it is also possible to modulate both armatures 140 and 160 simultaneously by modulating current between 0 and a value exceeding the second armature operation limit as in FIGS. 13A, 13B, and 13C.

Exemplary structural features of the purge valve 110 that make it possible to actuate only the first armature 140 in response to relatively low current (which is below the second armature operation limit) while maintaining the second armature 160 in a closed position, and maintain the first armature 140 in the open position while actuating the second armature 160 when the current exceeds the second armature operation limit, will now be described in detail. Although the structural features are described below in relation to the purge valve 110, the structural features may be included with the purge valves 210 and 310 to make it possible to actuate only the first armature 140 or only the second armature 160.

For example and as illustrated in FIGS. 3A and 3B, the purge valve 110 may include a first magnetic shunt 180 and a second magnetic shunt 182. The first magnetic shunt 180 is defined by the stator core 134 and is suitably positioned to obtain the desired force on the first armature 140. The second magnetic shunt 182 is defined by the stator core 134 and is suitably positioned to obtain the desired force on the second armature 160. In some embodiments, the first magnetic shunt 180 may be thinner than the second magnetic shunt 182. As a result, for a given current the magnetic force applied to the first armature 140 will be greater than the magnetic force applied to the second armature 160, which results in less current required to actuate the first armature 140.

As illustrated in FIG. 4, the first magnetic shunt 180 may be formed with a surface 180' oriented at a relatively steep (or shallow) angle as compared to surface 182' of the second shunt 182, which is formed at a relatively shallow (or steep) angle. As a result, magnetic force applied to the first armature 140 will be different than the magnetic force applied to the second armature 160. As illustrated in FIG. 5, the first shunt surface 180' may be arranged relatively closer to (or further from) the bottom of the first armature 140 as compared to the position of the second shunt surface 182' to the bottom of the second armature. As a result, the magnetic force applied to the first armature 140 will be different than the magnetic force exerted on the second armature 160. With reference to FIG. 6, the first armature 140 and the second armature 160 may be made of different materials. For example, the first armature 140 may be made of relatively low carbon steel, and the second armature 160 may be made of relatively extra low carbon steel. Low carbon steel and extra low carbon steel have different BH curves, and thus the two armatures 140, 160 will receive different magnetic forces. The magnetic force exerted to the first armature 140 will be different than the magnetic force exerted to the second armature 160.

With reference to FIG. 7, the coil 132 may be configured with a first portion 132A and a second portion 132B, which are wound in opposite directions, and may or may not be connected together. As a result, two distinct flux loops are created by the coil 132. The coil 132 is further configured such that the portion thereof surrounding the first armature 140 has more coils than the portion thereof surrounding the second armature 160. Thus for a given current, the magnetic force applied to the first armature 140 is greater than the magnetic force applied to the second armature 160.

With reference to FIG. 8, the first return spring 144 and the second return spring 164 may have different degrees of stiffness. For example, the first return spring 144 may have a lower stiffness than the second return spring 164. This difference in stiffness may be provided in any suitable manner, such as providing the springs 144/164 with different materials and/or lengths. As a result, the amount of magnetic force required to actuate the first armature 140 will be different than the amount required to actuate the second armature 160.

With reference to FIG. 9, the first opening 150 may have a smaller diameter than the second opening 170. Thus the area that the first seal 142 seals will be smaller than the area that the second seal 162 seals. As a result, a smaller vacuum force will act on the first seal 142 as compared to the second seal 162. Consequently, the first armature 140 will require a smaller magnetic force to overcome the vacuum force compared with the second armature 160.

Figure 10:
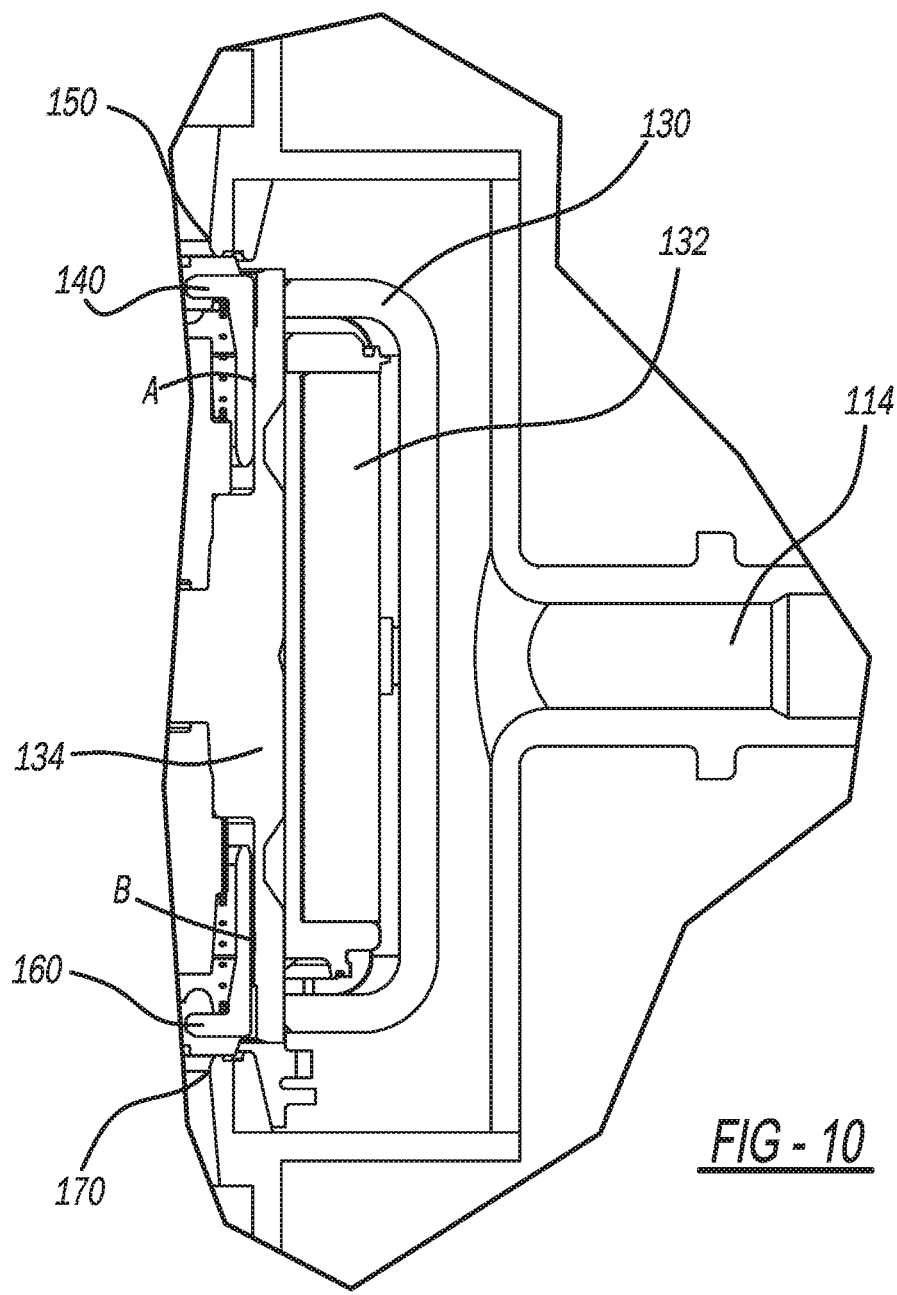
FIG. 10 is a view of still another embodiment of the purge valve according to the present disclosure.

With reference to FIG. 10, the first armature 140 contacts a surface of the stator core 134 at reference numeral A. The second armature 160 contacts a surface of the stator core 134 at reference numeral B. The surfaces of the first and second armatures 140 and 160 and/or the stator core 134 may be treated in any suitable manner such that friction between the first armature 140 and the stator core 134 at A is different than the friction force between the second armature 160 and the stator core 134 at reference numeral B. For example, the friction force between the first armature 140 and the stator core 134 may be less than the friction force between the second armature 160 and the stator core 134. As a result, relatively less magnetic force will be required to actuate the first armature 140 as compared to the second armature 160.

The present disclosure thus advantageously provides for more accurate release of fuel vapors 26 to the engine 18 at both low flow and high flow conditions in order to most effectively take advantage of the opportunities that the purge valve 110 has to operate, particularly in hybrid vehicle applications where the engine 18 is not always running. Advantageously, the purge valve 110 may have a single coil 132 and a single electrical connector 70, as well as a single main inlet conduit 114 and a single main outlet conduit 116. Alternatively, the purge valve may have multiple coils 132 as shown in FIG. 7. These features may advantageously simplify manufacturing and installation of the purge valve 110, and generally reduce the overall cost thereof in comparison to two separate purge valves.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A purge valve for an evaporative emission control (EVAP) system of an engine fuel supply system, the purge valve comprising:
    a chamber having an inlet conduit for receiving fuel vapors from an evaporative emission control (EVAP) canister, a first outlet conduit to an engine for the fuel vapors, and a second outlet conduit to the engine for the fuel vapors;
    a coil within the chamber;
    a stator core surrounded by the coil;
    a first armature seated within the stator core and movable to open and close a first opening to the first outlet conduit;

a second armature seated within the stator core and movable to open and close a second opening to the second outlet conduit;

a first magnetic flux shunt defined by the stator core spaced apart from the first opening to allow the first armature to be actuated into an open position; and a second magnetic flux shunt defined by the stator core spaced apart from the second opening to allow the second armature to be actuated into an open position, the first magnetic flux shunt and the second magnetic flux shunt are configured differently such that the first armature and the second armature are actuated with different force;

wherein energizing the purge valve at a first current actuates the first armature from a closed position to the open position to open the first opening and allow fuel vapors to flow through the first outlet conduit to the engine, without actuating the second armature from a closed position; and wherein energizing the purge valve at a second current that is greater than the first current actuates the second armature from the closed position to the open position, while the first armature remains in the open position, to open the second opening and allow additional fuel vapors to flow through the second outlet conduit to the engine.

2. The purge valve of claim 1,
wherein the first magnetic flux shunt is a first distance from the first opening and the second magnetic flux shunt is a second distance from the second opening, the first distance is different from the second distance to vary the force at which the first armature and the second armature are actuated.

3. The purge valve of claim 1, wherein the first armature is made of a first material and the second armature is made of a second material that is different from the first material; and
wherein the first material and the second material have different magnetic properties to vary the force at which the first armature and the second armature are actuated.

4. The purge valve of claim 1, wherein the coil includes a first portion extending around the first armature and a second portion extending around the second armature; and
wherein the first portion is wound in a first direction and the second portion is wound in a second direction opposite to the first direction; and
wherein the first portion includes a first number of coil turns and the second portion includes a second number of coil turns that is different from the first portion to vary the force at which the first armature and the second armature are actuated.

5. The purge valve of claim 1, further comprising:
a first return spring configured to apply a first spring force against the first armature to bias the first armature in the closed position to close the first opening; and
a second return spring configured to apply a second spring force against the second armature to bias the second armature in the closed position to close the second opening;
wherein the first spring force is different from the second spring force.

6. The purge valve of claim 1, further comprising:
a first return spring having a first length and configured bias the first armature in the closed position to close the first opening; and a second return spring having a second length and configured bias the second armature in the closed position to close the second opening;
wherein first length is different from the second length.

7. The purge valve of claim 1, further comprising:
a first return spring having a first stiffness and configured bias the first armature in the closed position to close the first opening; and
a second return spring having a second stiffness and configured bias the second armature in the closed position to close the second opening;
wherein first stiffness is different from the second stiffness.

8. The purge valve of claim 1, wherein the first opening is a different size from the second opening.

9. The purge valve of claim 1, wherein the first armature includes a first rubber seal that is a different size from a second rubber seal of the second armature.

10. The purge valve of claim 1, wherein:
the first armature and the second armature abut against the stator core and slide against the stator core when moved; and
surfaces of at least one of the first armature, the second armature, and the stator core are configured such that a first friction force between the first armature and the stator core is different from a second friction force between the second armature and the stator core.

11. The purge valve of claim 1, wherein the purge valve includes only a single electrical connector.

12. The purge valve of claim 1, wherein the first outlet conduit and the second outlet conduit converge into a single main outlet conduit that directs fuel vapors to the engine.

13. The purge valve of claim 1, wherein the purge valve includes more than one electrical connector.

14. The purge valve of claim 1, wherein the first armature and the second armature are vertically aligned.

15. The purge valve of claim 1, wherein the first armature and the second armature are oriented to actuate in parallel directions that are not vertically aligned.

16. The purge valve of claim 1, wherein the first armature and the second armature are oriented to actuate along different axes including axes perpendicular to one another.

17. A purge valve for an evaporative emission control (EVAP) system of an engine fuel supply system, the purge valve comprising:
a chamber having an inlet conduit for receiving fuel vapors from an evaporative emission control (EVAP) canister, a first outlet conduit to an engine for the fuel vapors, and a second outlet conduit to the engine for the fuel vapors;
a coil within the chamber;
a stator core surrounded by the coil;
a first armature seated within the stator core and movable to open and close a first opening to the first outlet conduit;
a second armature seated within the stator core and movable to open and close a second opening to the second outlet conduit;
a first magnetic flux shunt defined by the stator core spaced apart from the first opening to allow the first armature to be actuated into an open position; and
a second magnetic flux shunt defined by the stator core spaced apart from the second opening to allow the second armature to be actuated into an open position, the first magnetic flux shunt has a first thickness and the second magnetic flux shunt has a second thickness that is different from the first thickness such that the first armature and the second armature are actuated with different force;

wherein energizing the purge valve at a first current actuates the first armature from a closed position to the open position to open the first opening and allow fuel vapors to flow through the first outlet conduit to the engine, without actuating the second armature from a closed position; and wherein energizing the purge valve at a second current that is greater than the first current actuates the second armature from the closed position to the open position, while the first armature remains in the open position, to open the second opening and allow additional fuel vapors to flow through the second outlet conduit to the engine.

18. A purge valve for an evaporative emission control (EVAP) system of an engine fuel supply system, the purge valve comprising:

a chamber having an inlet conduit for receiving fuel vapors from an evaporative emission control (EVAP) canister, a first outlet conduit to an engine for the fuel vapors, and a second outlet conduit to the engine for the fuel vapors;

a coil within the chamber;

a stator core surrounded by the coil;

a first armature seated within the stator core and movable to open and close a first opening to the first outlet conduit;

a second armature seated within the stator core and movable to open and close a second opening to the second outlet conduit;

a first magnetic flux shunt defined by a first angled surface of the stator core opposite to the first armature; and a second magnetic flux shunt defined by a second angled surface of the stator core opposite to the second armature, the first angled surface and the second angled surface are angled differently such that the first armature and the second armature are actuated with different force;

wherein energizing the purge valve at a first current actuates the first armature from a closed position to an open position to open the first opening and allow fuel vapors to flow through the first outlet conduit to the engine, without actuating the second armature from a closed position; and wherein energizing the purge valve at a second current that is greater than the first current actuates the second armature from the closed position to an open position, while the first armature remains in the open position, to open the second opening and allow additional fuel vapors to flow through the second outlet conduit to the engine.

* * * * *

UNITED STATES PATENT AND TRADEMARK OFFICE
CERTIFICATE OF CORRECTION

PATENT NO. : 10,851,736 B1  
APPLICATION NO. : 16/429251  
DATED : December 1, 2020  
INVENTOR(S) : Michael Ozika et al.

Page 1 of 1

It is certified that error appears in the above-identified patent and that said Letters Patent is hereby corrected as shown below:

On the Title Page

Column 1, (22) Filed, Line 1: After "2019", insert --¶(65) Prior Publication Data
US 2020/0378346 A1 Dec. 3, 2020--

Signed and Sealed this
Nineteenth Day of January, 2021

Andrei Iancu
*Director of the United States Patent and Trademark Office*